SOLID STATE JUNCTION PHOTOPOTENTIOMETER

Filed June 26, 1962

INVENTOR.
STANLEY R. MORRISON
BY Robert O. Vidas
ATTORNEY

United States Patent Office 3,222,531

Patented Dec. 7, 1965

3,222,531
SOLID STATE JUNCTION PHOTOPOTENTIOMETER

Stanley R. Morrison, Minnetonka, Minn., assignor to Honeywell Inc., a corporation of Delaware Filed June 26, 1962, Ser. No. 205,422
18 Claims. (Cl. 250—211)

The present invention relates generally to photopotentiometers. The photopotentiometer is a device in which, when a light strip is moved linearly across its surface in a predetermined direction, the output voltage of the device will vary in proportion to the distance moved.

Photopotentiometers known in the prior art operate on photoconductive principles and in one form have generally been made by using a semiconducting thin film such as cadmium sulphide or cadmium selenide for the light sensitive contact. A nichrome strip is deposited on this thin film for the resistor and a metallic strip, e.g., gold, is deposited for the output with only a thin region (in the order of 0.005 inch) separating the nichrome and gold strips. As a light shines across the semiconducting material, the resistance changes by about five orders of magnitude. The gold strip then assumes the potential of the nichrome resistor at the point of light.

An object of this invention is to provide an improved photopotentiometer comprising a pair of diode strips on a semiconductive base to form junctions which, when exposed to a light beam, exhibit a change in the reverse bias leakage across the junctions, thus allowing the voltage output of the device to vary with the movement of the light beam.

Another object of this invention is to utilize single crystal technology to prepare a photopotentiometer. This, of course, means that the photopotentiometer of the present invention will have a twofold advantage over those of the prior art which utilize the simpler photoconductive techniques and materials.

First, since the photopotentiometer will be based on single crystal processes, it will be more reproducible.

Second, it will require only standard semiconductor technology, as extensively developed for silicon transistors and for microminiaturization. Thus the width of the strips can be corrected for non-linearity in the output or a system of any shape can be designed to follow complicated motions of the light source in any given situation.

Yet another object of this invention is to provide an improved photopotentiometer the time constant of which is in the order of microseconds, limited by the lifetime of the semiconductive material such as silicon, compared to the time constant for the photoconductive materials of the prior art, such as cadmium sulphide, which is in the order of milliseconds. This advantage results in a much faster response time for the device.

The junction photopotentiometer of this invention includes a semiconductor body (also herein termed a base region) of high resistivity having two strips of semiconductive material of another conductivity type formed therein. The junctions may be formed by any of the more common techniques utilized in the semiconductor art such as diffusion, alloying, or by epitaxial techniques; all well known methods of the semiconductor art.

One of the junction strips is contacted by spaced ohmic electrodes and a potential gradient is applied therebetween. This junction strip then functions in the manner of a rheostat on a typical potentiometer. The other strip is contacted with one ohmic electrode and functions as the wiper of a typical potentiometer. There is no electrical connection to the high resistivity base. In the dark, each region of the base is reverse-biased to one or the other of the two junctions, or of equal potential to both.

Whether reverse biased or of equal potential, the resistance will be high. On the other hand, if a bar or beam of light extends from one strip to the other, it will cause both junctions to be leaky and short the wiper junction to the rheostat junction at that point, thus the wiper will assume the potential of the rheostat at that particular point.

The invention will be described in greater detail by reference to the following description taken in connection with the accompanying drawing in which.

Figures 1, 2, 3, 4, 5:
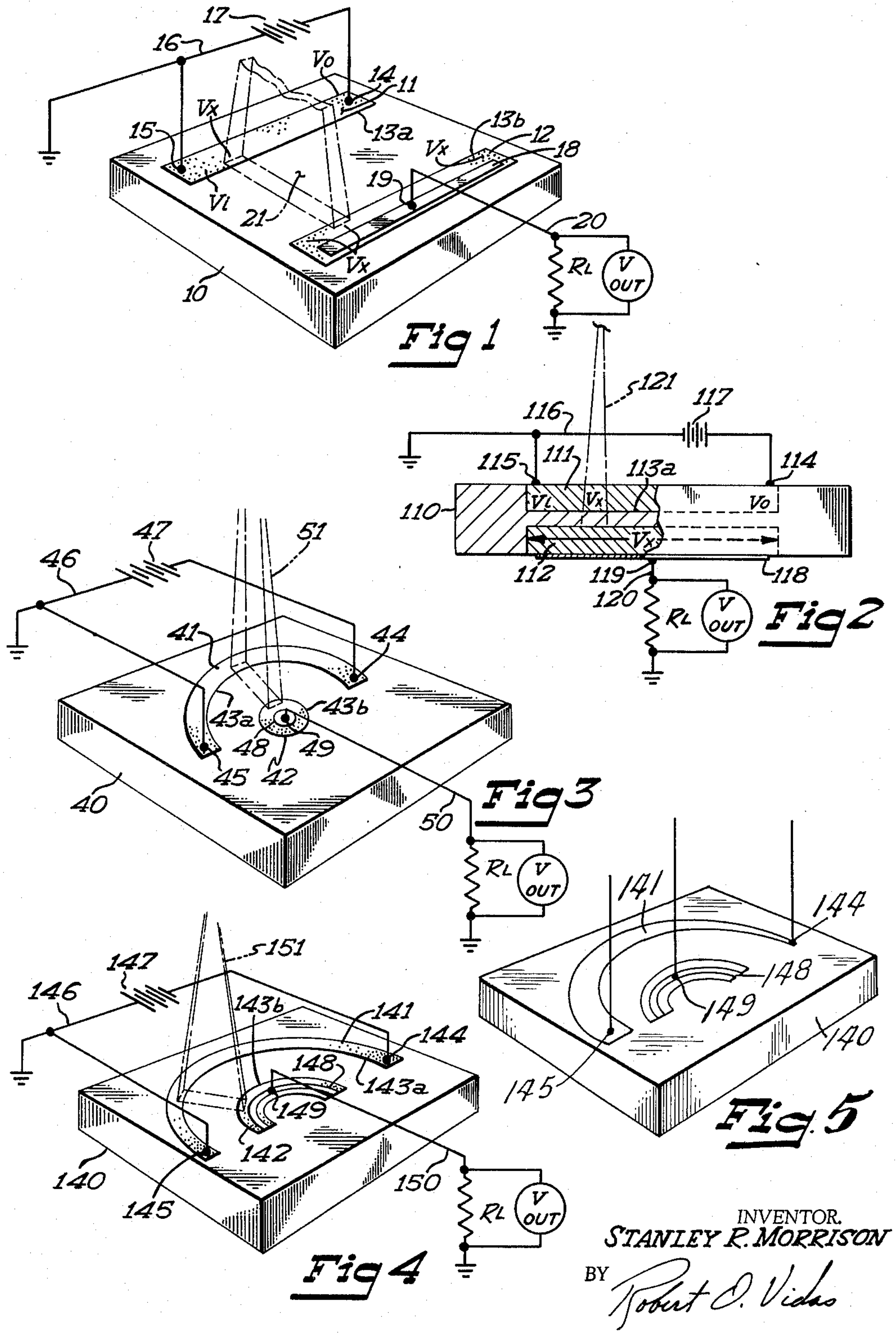
FIGURE 1 is a perspective and schematic view of a junction photopotentiometer and associated circuit according to the present invention.
FIGURE 2 is a side view with a portion broken away disclosing an alternate arrangement of the junction strips on a photopotentiometer in accordance with the present invention.
FIGURE 3 is a perspective and schematic view of a further embodiment of the device, in accordance with the present invention, illustrating another configuration of the junction strips which may be utilized.
FIGURE 4 is also a perspective and schematic view of a further embodiment of a device, in accordance with the present invention, illustrating still another configuration of the junction strips which may be utilized.
FIGURE 5 is a planar view of a device similar to FIGURE 4.

Referring now to FIGURE 1, a junction photopotentiometer in accordance with the present invention is disclosed consisting of a base region 10, with regions 11 and 12 of different conductivity types having junctions 13*a* and 13*b* formed therebetween. Region 10 is commonly termed the base layer or base region and may consist of any semiconductive material such as silicon, germanium or the like. For the purposes of the present illustration, assume the base region 10 is of a P-type silicon. Regions 11 and 12 may be any semiconductive material of a conductivity type which forms a rectifying junction with the material utilized for the base region 10. Assume that phosphorus has been diffused into region 10 to form N-type regions 11 and 12 and junctions 13*a* and 13*b* respectively.

Region 11 (herein also termed strip junction) is shown contacted by ohmic electrodes 14 and 15 at opposite ends thereof. Electrodes 14 and 15 are in turn associated with circuit 16 containing a potential source or voltage input such as, battery 17, which is utilized to provide a potential gradient along strip junction 11. Region 11 thus corresponds to the rheostat of a typical potentiometer and will be referred to as rheostat 11 hereinafter.

Region 12 (also hereinafter termed strip junction) is shown contacted by a conductive layer 18, such as, a metal coating, which makes region 12 equipotential. Of course, other means are available for rendering region 12 equipotential, such as the application of a high load resistance in the external circuit, which makes the potential drop along region 12 negligible. Other means are obvious to those skilled in the art. Region 12 is contacted by a single ohmic electrode 19 which is associated in external circuit 20 with a load resistance ($R_L$) across which the voltage output ($V_{OUT}$) of the device is measured. Region 12 thus corresponds to the wiper of a typical potentiometer and will be referred to as wiper 12 hereinafter.

If a beam of light 21 is positioned so as to contact rheostat 11 and wiper 12, it will cause both junctions 13*a* and 13*b* to be leaky and short rheostat 11 to wiper 12 at the points of contact. Since wiper 12 is equipotential, it will uniformly assume the value of the potential on rheostat 11 corresponding to the point at which rheostat 11 is contacted by light beam 21. This potenial is sensed as a voltage drop across $R_L$ by a voltmeter or the like as $V_{OUT}$. Although light beam 21 is shown as extending continuously from rheostat 11, across base region 10 to wiper 12, it is not necessary that it be continuous. As long as the two junctions 13*a* and 13*b* are contacted by the light the device will operate. For example, two light beams could be utilized, one contacting junction 13*a* and the other contacting junction 13*b*.

At other points along rheostat 11 and wiper 12, the junction strips are insulated from each other by a reverse-biased junction on one side or the other.

For purposes of illustration, assume that a potential gradient of $V_O$–$V_I$ is applied to rheostat 11. The potential at the ends of rheostat 11 is then $V_O$ and $V_I$ respectively, all other points being of intermediate value. If the light beam contacts rheostat 11 at $V_X$, wiper 12 will assume a uniform potential $V_X$. At points $V_X$–$V_I$ on rheostat 11 the voltage will be greater than $V_X$ on wiper 12 and the easy direction of current flow will be from rheostat 11, across junction 13*a* and into the base region 10. But, the current cannot flow across junction 13*b* since the junction assumes a reverse-bias to the potential which base region 10 has assumed from rheostat 11, and the minority carriers injected from the forward biased rheostat 11 will not reach junction 13*b* as the spacing between the two is much greater than a diffusion length.

It is important to note that the smallest allowable dimension between the junction strips 11 and 12 is determined essentially by the diffusion length of the minority carriers. Since minority carriers are not inhibited by the same reverse-bias at a junction which inhibits majority carriers, it is necessary that the junction strips be positioned greater than one diffusion length distant from each other.

At points $V_O$–$V_X$, wiper 12 has a potential $V_X$ which is greater than $V_O$–$V_X$ on rheostat 11. Thus, in this portion of the device, the easy direction of current flow will be from wiper 12, across junction 13*b* to base region 10, but since junction 13*a* assumes a reverse-bias with respect to base region 10, the current cannot flow across junction 13*a*. Thus, the two junction strips are insulated from each other at all points except those at which contact is made by light beam 21. Since base region 10 is of high resistivity, for example 200 ohms cm., current is prevented from flowing laterally in base region 10 and thus shorting the junction strips.

Many variations of the device shown in FIGURE 1 are possible. As shown, rheostat 11 and wiper 12 are placed parallel to each other with rheostat 11 having a uniform resistivity, which makes linear measurements possible. But, by placing the strips in non-parallel relationship or by varying the resistivity of rheostat 11 or wiper 12, in any predetermined manner, non-linear measurements of any desired type can be obtained. Also, the two junction strips can be formed in any regular or irregular patterns to follow a more complicated motion of a light source in any given situation.

Referring now to FIGURE 2, another form, which the present invention may assume, is disclosed. In FIGURE 2, members corresponding to those in FIGURE 1 are numbered accordingly with three digits. In this embodiment, rheostat 111 and wiper 112 are positioned on opposite surfaces of base 110. Since semiconductive materials are transparent to light under certain circumstances, the light beam 121 is shown illuminating a point on rheostat 111 and penetrating through base region 110 to contact a corresponding point on wiper 112. At these points of contact, wiper 112 uniformly assumes the potential of rheostat 111 (due to equipotential coating 118) in the same manner as discussed above, and all other points are reverse-biased at either rheostat 111 (junction 113*a*) or wiper 112 (junction 113*b*). The potential assumed by wiper 112 is again sensed as a voltage drop across $R_L$ as $V_{OUT}$. Here also two light beams may be utilized to render the junctions leaky, one for illuminating junction 113*a* from above and the other for illuminating junction 113*b* from below.

Reference is now made to FIGURES 3 and 4 which disclose further configurations which may be utilized in accordance with the present invention depending upon the movement of the light source.

In FIGURE 3, members which are equivalent to those of FIGURE 1 are numbered three decades greater in value. FIGURE 3 shows wiper 42 in a circular configuration, partially surrounded by rheostat 41 which is semicircular in shape. This configuration may be utilized to sense the movement of a rotating light beam or the like 51, which is pivoted or centered at wiper 48. As light beam 51 pivots at wiper 42, the opposite edge thereof moves along the length of rheostat 41. Thus, wiper 42 senses the variation of potential on rheostat 41 in the same manner as previously discussed.

In FIGURE 4, members corresponding to those in FIGURE 3 are numbered accordingly with three digits. This figure discloses yet another configuration which the rheostat and wiper may assume in order to accommodate a particular type of moving light source. In this case, the light source 151 moves in a semi-circular pattern contacting rheostat 141 and wiper 142 in its travel. Wiper 142 is shorted to rheostat 141 at any particular moment of travel and thus senses the varying potential gradient applied to rheostat 141 by voltage source 147.

FIGURE 5 shows a device similar to that of FIGURE 4 wherein it is shown that the junctions may be varied in cross-sectional area in order to modify the output of the device in any desired manner. Rheostat 141 only is shown as having a non-uniform cross-sectional area for this purpose in FIGURE 5 although wiper 142 could also be formed in the same fashion.

It is to be understood that the present invention is not to be limited to those materials which are sensitive to visible light only. The wavelength response can be varied by using other semiconductors. For example, a device in accordance with the present invention composed of indium antimonide or the like will extend the operation of the device into the far infrared wavelength region while germanium may be utilized for the near infrared region. Other materials which will extend the device of the present invention to other desired wavelengths, will be obvious to those skilled in the art.

What is claimed is:

1. A light sensitive device comprising: a high resistivity semiconductor base of one conductivity characteristic having two regions of another conductivity characteristic disposed thereon; the first of said regions having a predetermined configuration and forming a first light sensitive junction area with said base; two electrodes in spaced relationship forming ohmic contacts on said first region; the second of said regions forming a second light sensitive junction area with said base, said second region being located in a predetermined spaced relationship with said first region; and an electrode forming an ohmic contact to said second region.

2. A light sensitive device comprising: a high resistivity semiconductor base of one conductivity characteristic having two regions of another conductivity characteristic disposed thereon; the first of said regions having a predetermined configuration and forming a first light sensitive junction area with said base; two electrodes in spaced relationship forming ohmic contacts on said first region; means for applying a potential gradient across said first region between said contacts; the second of said regions forming a second light sensitive junction area with said base, said second region being located in a predetermined spaced relationship with said first region; an electrode forming an ohmic contact on said second region; and circuit means connected between one of said contacts on said first region and said ohmic contact on said second region.

3. A light sensitive device comprising: a high resistivity semiconductor base of one conductivity characteristic having two regions of another conductivity characteristic disposed thereon; the first of said regions having a predetermined configuration and forming a first light sensitive junction area with said base; ohmic contacts in spaced relationship on said first region; means for applying a potential gradient across said first region between said contacts; the second of said regions forming a second light sensitive junction area with said base greater than one minority carrier diffusion length distant from said first region, said second region being located in a predetermined spaced orientation with respect to said first region; an ohmic contact on said second region; circuit means connected between one of said contacts on said first region and said ohmic contact on said second region, and means for impinging light on portions of said junction areas and for sweeping the light over the length of said areas to expose incremental portions thereof to the light.

4. The device of claim 3 in which the cross-sectional area of said first region varies in a predetermined manner with the length thereof, said variation affecting the linearity of the output of said device.

5. The device of claim 3 in which a predetermined resistivity gradient is provided along the length of said first region, said gradient affecting the linearity of the output of said device.

6. A light sensitive device comprising: a high resistivity semiconductor base of one conductivity characteristic having two regions of another conductivity characteristic disposed thereon; the first of said regions having a predetermined configuration and forming a first light sensitive junction area with said base; two ohmic contacts in spaced relationship on said first region; means for applying a potential gradient across said first region between said contacts; the second of said regions forming a second light sensitive junction area with said base greater than one minority carrier diffusion length distant from said first region, said second region being located in a predetermined spaced orientation with respect to said first region, said second region being further characterized in that it is equipotential; an ohmic contact on said second region; circuit means connected between one of said contacts on said first region and said ohmic contact on said second region, and means for impinging light on portions of said first and second junction areas and for sweeping the light over the length of said areas to expose incremental portions thereof to the light.

7. The device of claim 6 in which the cross-sectional area of said first region varies in a predetermined manner with the length thereof, said variation affecting the linearity of the output of said device.

8. The device of claim 6 in which a pretermined resistivity gradient is provided along the length of said first region, said gradient affecting the linearity of the output of said device.

9. A light sensitive device comprising: a high resistivity semiconductor base of one conductivity characteristic having two elongated regions of another conductivity characteristic on a surface thereof; the first of said regions being of a predetermined configuration and forming a first light sensitive junction area with said surface; a pair of ohmic contacts in spaced relationship on said first region; means for applying a potential gradient across said first region between said contacts; the second of said regions forming a second light sensitive junction area with said surface greater than one minority carrier diffusion length distant from said first region and having a configuration dependent upon said first region configuration, said second region being located in a predetermined spaced orientation with respect to said first region and being equipotential by means of a conductive layer on the surface thereof; an ohmic contact on said second region; circuit means connected between one of said ohmic contacts on said first region and said ohmic contact on said second region, and means for impinging light on a portion of said first and second junction areas and for moving the light over the length of said areas to expose incremental portions thereof to the light.

10. A light sensitive device comprising: a high resistivity semiconductor base of one conductivity characteristic having two regions of another conductivity characteristic located on opposite first and second faces thereof; the first of said regions having a predetermined configuration and forming a first light sensitive junction area with said first face of said base; two ohmic contacts in spaced relationship on said first region; means for applying a potential gradient across said first region between said contacts; the second of said regions forming a second light sensitive junction area with said second face of said base greater than one minority carried diffusion length distant from said first region; said second region being located in a predetermined spaced orientation with respect to said first region; an ohmic contact on said second region; circuit means connected between one of said contacts on said first region and said ohmic contact on said second region; means for impinging light on portions of said junction areas and for moving the light over the length of said areas to expose incremental portions thereof to the light.

11. A solid state photopotentiometer comprising: a high resistivity semiconductor base of one conductivity type having two regions of another conductivity type disposed thereon; the first of said regions being essentially elongated and forming a first light sensitive junction area with said base; two electrodes in spaced relationship forming ohmic contacts on said first region; means for applying a potential gradient across said elongated region between said electrodes; the second of said regions being equipotential and forming a second light sensitive junction area with said base greater than one minority carrier diffusion length distant from said first region; an electrode forming an ohmic contact on said second region, and circuit means connected between one of said contacts on said first region and said contact on said second region.

12. A solid state photopotentiometer comprising: a high resistivity semiconductor base of one conductivity type having two regions of another conductivity type disposed thereon; the first of said regions being essentially elongated and forming a first light sensitive junction area with said base; two electrodes in spaced relationship forming ohmic contacts on said first region; means for applying a potential gradient across said elongated region between said electrodes; the second of said regions being equipotential and forming a second light sensitive junction area with said base greater than one minority carrier diffusion length distant from said first region; an ohmic contact on said second region; circuit means connected between one of said contacts on said first region and said ohmic contact on said second region, and means for impinging a light beam on incremental portions of said junction areas.

13. A solid state photopotentiometer comprising: a high resistivity semiconductor base of one conductivity type having two elongated regions of another conductivity type disposed thereon; the first of said regions forming a first light sensitive junction area with said base; two electrodes in spaced relationship forming ohmic contacts on said first region; means for applying a potential gradient across said elongated region between said electrodes; the second of said regions being spaced from said first region and forming a second light sensitive junction area with said base; an ohmic contact on said second region; circuit means connected between one of said ohmic contacts on said first region and said ohmic contact on said second region; and means for impinging light on portions of said first and second junction areas and for moving the light over the length of said areas.

14. A solid state photopotentiometer comprising: a high resistivity semiconductor base of one conductivity type having two elongated regions of another conductivity type disposed thereon; the first of said regions forming a first light sensitive junction area with said base; two electrodes in spaced relationship forming ohmic contacts on said first region; means for applying a potential gradient across said first region between said electrodes; the second of said regions being equipotential and forming a second light sensitive junction area with said base in spaced relationship with said first region; an ohmic contact on said second region; circuit means connected between one of said ormic contacts on said first region and said ohmic contact on said second region, and means for impinging a light beam on said junction areas and for sweeping the light over the length of said areas.

15. A solid state photopotentiometer comprising: a high resistivity semiconductor base of one conductivity type having two elongated regions of another conductivity type disposed thereon; the first of said regions forming a first light sensitive junction area with said base; two electrodes in spaced relationship forming ohmic contacts on said first region; means for applying a potential gradient across said first region between said electrodes; the second of said regions being equipotential and forming a second light sensitive junction area with said base greater than one minority carrier diffusion length distant from said first region; an ohmic contact on said second region; circuit means connected between one of said ohmic contacts on said first region and said ohmic contact on said second region, and means for impinging light on a portion of said first and second junction areas and for moving the light over the length of said areas to expose incremental portions thereof to the light.

16. The device of claim 15 in which the cross-sectional area of said first region varies in a predetermined manner with the length thereof, said variation affecting the linearity of the output of said device.

17. The device of claim 15 in which a predetermined resistivity graident is provided along the length of said first region, said gradient affecting the linearity of the output of said device.

18. A solid state photopotentiometer comprising, a high resistivity semiconductor base of one conductivity type having two elongated regions of another conductivity type disposed on opposite faces thereof; the first of said regions forming a first light sensitive junction area with said base; two electrodes in predetermined spaced relationship forming ohmic contacts on said first region; means for applying a potential gradient across said elongated region between said electrodes; the second of said regions being equipotential and forming a second light sensitive junction area with said base at a distance greater than one minority carrier diffusion length from said first region; an ohmic contact on said second region; circuit means connected between one of said ohmic contacts on said first region and said ohmic contact on said second region, and means for impinging light on incremental portions of said junction areas.

References Cited by the Examiner

UNITED STATES PATENTS

| | | | |
|---|---|---|---|
| 1,514,123 | 11/1924 | Bacevicz | 250—211 X |
| 2,879,405 | 3/1959 | Pankove | 250—211 |
| 2,907,934 | 10/1959 | Engel | 250—211 X |
| 3,028,500 | 4/1962 | Wallmark | 250—211 |
| 3,033,073 | 5/1962 | Shuttleworth | 250—211 X |
| 3,087,069 | 4/1963 | Moncrieff-Yeates | 250—211 |

OTHER REFERENCES

Electronics: vol. 34, No. 32, Aug. 11, 1961, page 178.

RALPH G. NILSON, *Primary Examiner.*